(12) United States Patent
Koike et al.

(10) Patent No.: US 7,654,351 B2
(45) Date of Patent: Feb. 2, 2010

(54) POWER SOURCE DEVICE AND BATTERY COOLING STRUCTURE FOR VEHICLE

(75) Inventors: Eiji Koike, Saitama (JP); Harumi Takedomi, Saitama (JP); Satoyoshi Oya, Saitama (JP); Kanae Ohkuma, Saitama (JP); Seiichi Sato, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 11/440,364

(22) Filed: May 25, 2006

(65) Prior Publication Data

US 2008/0196957 A1 Aug. 21, 2008

(30) Foreign Application Priority Data

Jun. 2, 2005 (JP) ............................. 2005-163089
Dec. 12, 2005 (JP) ............................. 2005-358069

(51) Int. Cl.
*B60R 16/04* (2006.01)
(52) U.S. Cl. ..................................... 180/68.5; 180/68.1
(58) Field of Classification Search ................ 180/68.5, 180/68.1, 68.2, 65.3, 65.1, 89.11; 165/47, 165/122, 96; 429/26, 27, 34; 62/239, 244, 62/259.2
See application file for complete search history.

(56) References Cited

U.S. PATENT DOCUMENTS 5,354,625 A * 10/1994 Bentz et al. .................... 429/26
5,387,477 A * 2/1995 Cheiky ........................ 429/26
5,392,873 A * 2/1995 Masuyama et al. ......... 180/68.5
5,477,936 A * 12/1995 Sugioka et al. ............ 180/68.5
5,490,572 A * 2/1996 Tajiri et al. ................ 180/68.2
5,559,420 A * 9/1996 Kohchi ...................... 180/68.5
5,571,630 A * 11/1996 Cheiky ........................ 429/26

(Continued)

FOREIGN PATENT DOCUMENTS

JP 05-193376 A 8/1993

(Continued)

OTHER PUBLICATIONS

Chinese Office Action in 2006100844481, issued Mar. 7, 2008.

(Continued)

*Primary Examiner*—Hau V Phan
(74) *Attorney, Agent, or Firm*—Westerman, Hattori, Daniels & Adrian, LLP

(57) ABSTRACT

A battery box housing a battery is mounted between left and right side frames extending in a longitudinal direction of a vehicle body so that the battery box is offset to a left side of the vehicle body, and an intake duct and an exhaust duct for cooling air for cooling the battery are connected to an end of the battery box on a right side of the vehicle body. Therefore, it is possible not only to protect the battery between the left and right frames from a shock caused upon a side collision, but also to ensure a space for disposition of the intake duct and the exhaust duct while ensuring a volume of the battery box to the maximum. Moreover, the battery box is connected at its left and right ends to the left and right side frames.

14 Claims, 15 Drawing Sheets

U.S. PATENT DOCUMENTS

| | | | |
|---|---|---|---|
| 5,937,664 A * | 8/1999 | Matsuno et al. | 62/259.2 |
| 6,094,927 A * | 8/2000 | Anazawa et al. | 62/239 |
| 6,188,574 B1 * | 2/2001 | Anazawa | 180/68.5 |
| 6,204,769 B1 * | 3/2001 | Arai et al. | 180/65.1 |
| 6,220,383 B1 * | 4/2001 | Muraki et al. | 180/68.5 |
| 6,315,069 B1 * | 11/2001 | Suba et al. | 180/68.5 |
| 6,457,542 B1 * | 10/2002 | Hosono et al. | 180/68.1 |
| 6,541,151 B2 * | 4/2003 | Minamiura et al. | 180/68.5 |
| 6,662,891 B2 * | 12/2003 | Misu et al. | 180/68.1 |
| 6,811,197 B1 * | 11/2004 | Grabowski et al. | 180/68.5 |
| 7,004,233 B2 * | 2/2006 | Hasegawa et al. | 165/47 |
| 7,025,159 B2 * | 4/2006 | Smith et al. | 180/68.1 |
| 7,051,825 B2 * | 5/2006 | Masui et al. | 180/68.5 |
| 7,070,015 B2 * | 7/2006 | Mathews et al. | 180/68.5 |
| 7,198,124 B2 * | 4/2007 | Amori et al. | 180/68.5 |
| 7,353,900 B2 * | 4/2008 | Abe et al. | 180/68.5 |
| 7,401,669 B2 * | 7/2008 | Fujii et al. | 180/65.1 |

FOREIGN PATENT DOCUMENTS

| | | |
|---|---|---|
| JP | 07-047846 A | 2/1995 |
| JP | 8-310256 | 11/1996 |
| JP | 11-120975 A | 4/1999 |
| JP | 2000-092623 A | 3/2000 |
| JP | 2000-351328 A | 12/2000 |
| JP | 2001-113959 A | 4/2001 |
| JP | 2001-233064 | 8/2001 |
| JP | 2001-233064 A | 8/2001 |
| JP | 2002-231321 A | 8/2002 |
| JP | 2003-317813 | 11/2003 |
| JP | 2004-001683 A | 1/2004 |
| JP | 2004-042698 A | 2/2004 |
| JP | 2004-306726 A | 11/2004 |
| JP | 2005-071759 | 3/2005 |
| JP | 2005-71759 A | 3/2005 |
| JP | 2005-205953 A | 8/2005 |
| JP | 2005-324771 A | 11/2005 |

OTHER PUBLICATIONS

Japanese Office Action dated Jun. 3, 2009, Application No. 2005-358069.

Japanese Office Action, Application No. 2005-358069, dated Sep. 9, 2009.

* cited by examiner

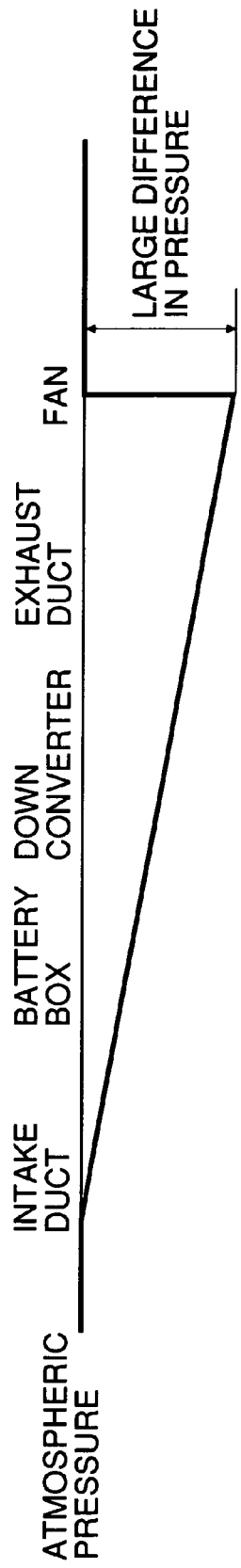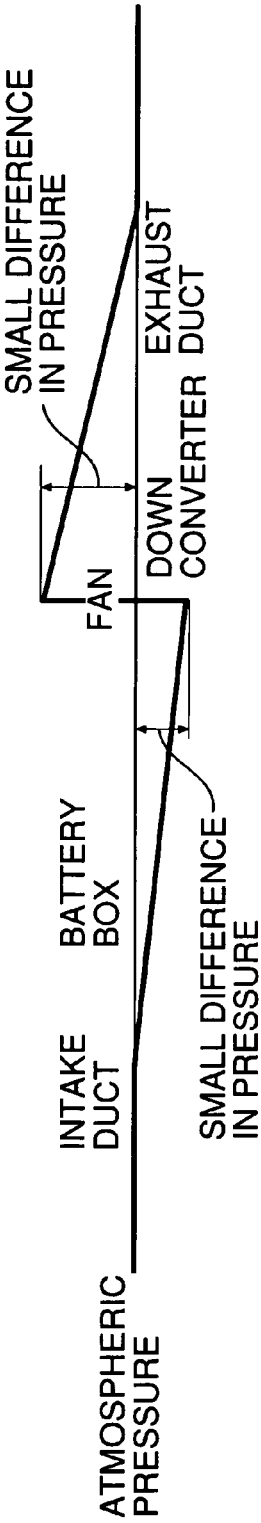

POWER SOURCE DEVICE AND BATTERY COOLING STRUCTURE FOR VEHICLE

RELATED APPLICATION DATA

The Japanese priority application Nos. 2005-163089 and 2005-358069 upon which the present application is based are hereby incorporated in their entirety herein by reference.

BACKGROUND OF THE INVENTION

1. Field of the Invention

The present invention relates to a power source device for supplying an electric power from a battery housed in a battery box to a motor for driving the vehicle, and to a battery cooling structure for cooling the battery by cooling air flowing through a cooling passage provided in the battery box.

2. Description of the Related Art

Japanese Patent Application Laid-open Nos. 2003-317813 and 2005-71759 disclose a battery cooling structure in which a battery box housing a battery for supplying an electric power to a motor-generator for a hybrid automobile is disposed in a front portion of a trunk room provided in the rear of a rear seat, and an intake duct and an exhaust duct for supplying and discharging cooling air for cooling the battery are connected to a left or right side face of the battery box.

When such a hybrid automobile is subjected to a side collision, it is necessary to protect the battery box from the damage, however, if a special reinforcement for protecting the battery box is provided, there is a problem that the weight of a vehicle body is increased, thus lowering vehicle performance.

Generally, left and right side frames disposed in a longitudinal direction on a side of a vehicle body are interconnected and reinforced by a laterally disposed cross member. A large load is applied from an upper end of a damper of a suspension system, particularly, to the side frame corresponding to a position corresponding to a wheel housing of a rear wheel, but if a power source device is mounted at such a portion, a space for disposition of the cross member is eliminated leading to a possibility that the rigidity of the vehicle body becomes insufficient.

Also, Japanese Patent Application Laid-open No. 8-310256 discloses a battery cooling structure in which a U-shaped cooling passage is formed within a battery frame which houses a battery for an electric automobile, and an intake duct and an exhaust duct are connected to a suction port and a discharge port formed at opposite ends of the cooling passage.

In this conventional structure, the cooling passage within the battery frame is formed into the U-shape, so that the suction port and the discharge port of the cooling passage are disposed adjacent each other at opposite ends on a shorter side of the battery frame. Therefore, there is a problem that the degree of freedom is largely limited for the layout of the intake duct and the exhaust duct connected to the suction port and the discharge port.

Further, Japanese Patent Application Laid-open No. 2001-233064 discloses a battery cooling structure in which a power source device for supplying an electric power to a motor-generator for a hybrid automobile is housed within a cover which supports a seat cushion of a rear seat, and cooling air for cooling a battery of the power source device is drawn in through an air path formed in a clearance between an upper surface of the cover and a lower surface of the seat cushion.

If the external air is directly used as cooling air for cooling a battery of a power source device for a hybrid automobile or the like, there is a possibility that the battery-cooling effect is reduced in a summer season in which the temperature of the external air is high. Therefore, it is desirable that air in a vehicle compartment conditioned to an appropriate temperature is used as cooling air.

As described above, even when there is demanded for using the air in the vehicle compartment as the cooling air for cooling the battery of the power source device, if the power source device is disposed in a trunk room in the rear of the seat, there is a problem that it is difficult to guide the air in the vehicle compartment to the power source device without degradation of the sitting property of the seat.

SUMMARY OF THE INVENTION

Accordingly, it is a first object of the present invention to protect a battery box of an electric automobile or a hybrid automobile from a shock caused upon a side collision without providing any special reinforcement in a vehicle body.

It is a second object of the present invention to ensure the rigidity of a vehicle body utilizing a power source device for an electric automobile or a hybrid automobile.

It is a third object of the present invention to increase the degree of freedom for the layout of an intake duct and an exhaust duct for supplying and discharging cooling air to and from a battery box having a U-shaped cooling passage.

It is a fourth object of the present invention to supply cooling air from a vehicle compartment to a battery box of a power source device disposed in the rear of a seat without degradation of the sitting property of the seat.

In order to achieve the first object, according to a first feature of the present invention, there is provided a power source device for a vehicle, comprising: a battery box housing a battery and mounted on a vehicle body, the battery supplying electric power to a motor for driving the vehicle, wherein the battery box is mounted between left and right side frames extending in a longitudinal direction of the vehicle body so as to be offset to one of left and right side, and wherein an intake duct and an exhaust duct for cooling air for cooling the battery are connected to the battery box at its end on the other of the left and right sides.

With the above feature, the battery box is mounted so as to be offset to one of the left and right sides between the left and right side frames extending in the longitudinal direction of the vehicle body, and the intake duct and the exhaust duct for cooling air for cooling the battery are connected to ends of the battery box on the other of the left and right sides. Therefore, it is possible not only to protect the battery box by the left and right side frames from a shock caused upon the side collision, but also to ensure a space for disposition of the intake duct and the exhaust duct, while ensuring the volume of the battery box to the maximum.

According to a second feature of the present invention, in addition to the first feature, the battery box is connected at its left and right ends to the left and right side frames.

With the above feature, the battery box is connected at its left and right ends to the left and right side frames and hence, it is possible not only to mount the battery box firmly on the vehicle body, but also to increase the rigidity of the left and right side frames by virtue of the battery box.

According to a third feature of the present invention, in addition to the first feature, a fan is mounted on the exhaust duct and disposed in a space between an exterior plate of the vehicle body and an interior material.

With the above feature, the fan mounted on the exhaust duct is disposed in the space between the exterior plate of the vehicle body and the interior material and hence, a noise caused by the fan can be shielded to enhance the quietness of the vehicle compartment.

According to a fourth feature of the present invention, in addition to the third feature, a silencer is mounted on the exhaust duct at a location downstream from the fan.

With the above feature, the silencer is mounted on the exhaust duct at the location downstream from the fan and hence, it is possible to reduce a noise caused by the cooling air flowing within the exhaust duct.

According to a fifth feature of the present invention, in addition to any of the first to fourth features, a filler tube for a fuel tank is mounted on one of left and right sides opposite from the intake duct and the exhaust duct.

With the above feature, the filler tube for the fuel tank is mounted on one of the left and right sides opposite from the intake duct and the exhaust duct and hence, the intake duct and the exhaust duct cannot interfere with the filler tube for the fuel tank, leading to an increase in degree of freedom for the layout.

According to a sixth feature of the present invention, in addition to the first or second feature, an electrical equipment is disposed between a fan connected to a cooling air outlet in the battery box and a cooling air inlet of the exhaust duct to cool the electrical equipment.

With the above feature, the electrical equipment is disposed between the fan connected to the cooling air outlet in the battery box and the cooling air inlet of the exhaust duct to cool the electrical equipment. Therefore, it is possible not only to cool the electric equipment for the vehicle utilizing the cooling air for cooling the battery, but also to decrease absolute values of a negative pressure and a positive pressure generated by the fan, as compared with a case where a fan is mounted at a downstream end of the exhaust duct, thereby enhancing the sealability of a flow path for the cooling air.

According to a seventh feature of the present invention, in addition to the sixth feature, the exhaust duct is connected to a tire pan formed on a floor surface of a trunk room.

With the above feature, the exhaust duct is connected to the tire pan formed on the floor surface of the trunk room and hence, the volume of the trunk room can be increased.

In order to achieve the second object, according to an eighth feature of the present invention, there is provided a power source device for a vehicle, comprising a battery box including a battery cover and a plurality of battery modules housed inside the battery cover, the battery modules supplying electric power to a motor for driving the vehicle, wherein the battery box further includes battery support frames supporting the battery modules and passing through the battery cover in a lateral direction of a vehicle body, the battery support frames being connected at their left and right ends to left and right side frames extending in a longitudinal direction of the vehicle body.

With the above feature, the battery box comprises the plurality of battery modules, the battery cover housing the battery modules, and the battery support frames which support the battery modules and which pass through the battery cover in the lateral direction of the vehicle body; and the battery support frames are connected at their left and right ends to the left and right side frames extending in the longitudinal direction of the vehicle body. Therefore, not only the battery box can be mounted firmly on the vehicle body, but also even if a cross member cannot be disposed at a location corresponding to the battery box, the battery support frames can exhibit the function of a cross member to increase the rigidity of the left and right side frames. Thus, it is possible to accommodate even an increase in weight due to the mounting of the battery box, without substantially changing a conventional structure of a vehicle body.

According to a ninth feature of the present invention, in addition to the eighth feature, the battery support frames are connected at their left and right ends to the left and right side frames at a location corresponding to a wheel housing.

With the above feature, the battery support frames are connected at their left and right ends to the left and right side frames at the location corresponding to a wheel housing. Therefore, an area where a load from a suspension system is applied to the side frames can be effectively reinforced by the battery support frames.

According to a tenth feature of the present invention, in addition to the eighth feature, the battery modules comprise a plurality of battery cells connected in series, and are disposed so that their lengthwise sides extend along a longitudinal direction of the vehicle body.

With the above feature, the elongated battery modules comprising the plurality of battery cells connected in series are disposed in the longitudinal direction of the vehicle body. Therefore, the plurality of battery cells can be reliably supported by the battery support frames extending in the lateral direction of the vehicle body.

According to an eleventh feature of the present invention, in addition to any of the eighth to tenth features, the battery cover is covered with a battery case made of metal.

With the above feature, the battery cover is covered with the battery case made of the metal and hence, the battery cover and the battery modules within the battery cover can be protected.

In order to achieve the third object, according to a twelfth feature of the present invention, there is provided a battery cooling structure comprising: a battery box housing a battery; and a cooling passage in a U-shape connected to an internal space of the battery box; the battery being cooled by cooling air flowing through the cooling passage, wherein the battery box includes a battery housing portion in which the cooling passage is formed and a cooling air guiding portion integrally connected to the battery housing portion; wherein a cooling air introducing passage and a cooling air discharging passage are formed in the cooling air guiding portion in a vertical direction by a partition wall extending in a horizontal direction; wherein a cooling air introducing port formed at an upstream end of the cooling air introducing passage is connected to an intake duct, and a first communication opening formed at a downstream end thereof is connected to an upstream end of the cooling passage; and wherein a cooling air discharging port formed at a downstream end of the cooling air discharging passage is connected to an exhaust duct, and a second communication opening formed at an upstream end thereof is connected to a downstream end of the cooling passage.

With the above feature, the cooling air introducing passage and the cooling air discharging passage separated vertically from each other by the partition wall extending in the horizontal direction are formed in the cooling air guiding portion integrally connected to the battery housing portion of the battery box; the cooling air introducing port at an upstream end of the cooling air introducing passage is connected to the intake duct, while the first communication opening at the downstream end of the cooling air discharging port is connected to the upstream end of the cooling passage; and the cooling air discharging port at the downstream end of the cooling air discharging passage is connected to the exhaust duct, while the second communication opening at the upstream end of the cooling air discharging passage is connected to the downstream end of the cooling passage. Therefore, the positions of the cooling air introducing port and the cooling air discharging port in the cooling air guiding portion can be determined without being restricted by the positions of the first and second communication openings connected to the cooling passage in the battery housing portion, leading to an increase in degree of freedom for the layout of the intake duct and the exhaust duct.

According to a thirteenth feature of the present invention, in addition to the twelfth feature, the cooling air introducing passage and the cooling air discharging passage cross each other as viewed in a vertical direction.

With the above feature, the cooling air introducing passage and the cooling air discharging passage cross each other as viewed in a vertical direction. Therefore, it is possible to further increase the degree of freedom for the layout of the cooling air introducing passage and the cooling air discharging passage, thereby further facilitating the layout of the intake duct and the exhaust duct.

According to a fourteenth feature of the present invention, in addition to the twelfth or thirteenth feature, an electrical equipment is supported on the partition wall, and cooled by the cooling air flowing through the cooling air discharging passage.

With the above feature, the electrical equipment supported on the partition wall is cooled by the cooling air flowing through the cooling air discharging passage. Therefore, the electrical equipment can be cooled utilizing the cooling air after cooling the battery.

In order to achieve the fourth object, according to a fifteenth feature of the present invention, there is provided a power source device for a vehicle, comprising a battery box housing a battery and disposed in the rear of a seat on which an occupant sits, the battery supplying electric power to a motor for driving the vehicle, air in a vehicle compartment being supplied through an intake duct into the battery box to cool the battery, wherein the intake duct is disposed in a space between the seat and a side portion of a vehicle body, and a suction port of the intake duct opens below a sitting surface of the seat.

With the above feature, the intake duct for supplying the air within the vehicle compartment into the battery box disposed in the rear of the seat on which the occupant sits, thereby cooling the battery, is disposed in the space between the seat and the side portion of the vehicle body, and the suction port of the intake duct opens below the sitting surface of the seat. Therefore, the air within the vehicle compartment can be supplied to the battery box without hindering the sitting property of the seat.

According to a sixteenth feature of the present invention, in addition to the fifteenth feature, the suction port opens into a space between a side face of a seat cushion and an inner face of a door.

With the above feature, the suction port opens into the space provided between the side face of the seat cushion and the inner surface of the door and hence, the suction port is thus less conspicuous, leading to an increase in aesthetic appearance.

According to a seventeenth feature of the present invention, in addition to the fifteenth feature, an air-conditioning blow-out port opens in front of and below the seat to face rearwards, and the suction port is offset upwards with respect to the blow-out port.

With the above feature, the suction port of the intake duct is offset with respect to the air-conditioning blow-out port which opens in front of and below the seat to face rearwards. Therefore, the warm air blown out of the blow-out port can be prevented from being drawn through the suction port into the intake duct, thereby ensuring a battery-cooling effect.

According to a eighteenth feature of the present invention, in addition to any of the fifteenth to seventeenth features, the intake duct has a sectional area of a flow path set at a value larger than an area of the suction port.

With the above feature, the sectional area of the flow path in the intake duct is set at the value larger than the area of the suction port. Therefore, the flow resistance to the air sucked through the suction port into the intake duct can be suppressed to the minimum, leading to an increase in the battery-cooling effect.

A rear seat 12 in an embodiment corresponds to the seat of the present invention; battery modules 23 in the embodiment correspond to the battery of the present invention; a lower battery support frame 25 in the embodiment corresponds to the battery support frame of the present invention; a lower battery cover 30 and an upper battery cover 31 in the embodiment correspond to the battery cover of the present invention; a first cooling passage 36 and a second cooling passage 37 in the embodiment correspond to the cooling passage of the present invention; and a down converter 46 in the embodiment corresponds to the electrical equipment of the present invention.

The above and other objects, features and advantages of the invention will become apparent from the following description of the preferred embodiment taken in conjunction with the accompanying drawings.

BRIEF DESCRIPTION OF THE DRAWINGS

FIG. 1 is a perspective view of a rear portion of a vehicle body of an automobile;

FIG. 2 is a view taken in a direction of an arrow 2 in FIG. 1;

FIG. 3 is a sectional view taken along a line 3-3 in FIG. 2;

FIG. 4 is an enlarged view of an area 4 in FIG. 2;

FIG. 5 is a sectional view taken along a line 5-5 in FIG. 4;

FIG. 6 is an exploded perspective view of a power source system;

FIG. 7 is an exploded perspective view of a battery box;

FIG. 8 is a perspective view of battery support frames;

FIG. 9 is a view taken in a direction of an arrow 9 in FIG. 9;

FIG. 10 is an exploded perspective view of a battery cover; and

FIG. 11 a diagram illustrating the battery box.

FIGS. 12 to 15 show a second embodiment of the present invention.

FIG. 12 is a view corresponding to FIG. 4;

FIG. 13 is a sectional view taken along a line 13-13 in FIG. 12;

FIG. 14 is a view corresponding to FIG. 11; and

FIGS. 15A and 15B are diagrams each showing a variation in pressure along a flow path of cooling air.

DETAILED DESCRIPTION OF PREFERRED EMBODIMENTS

Figure 1:
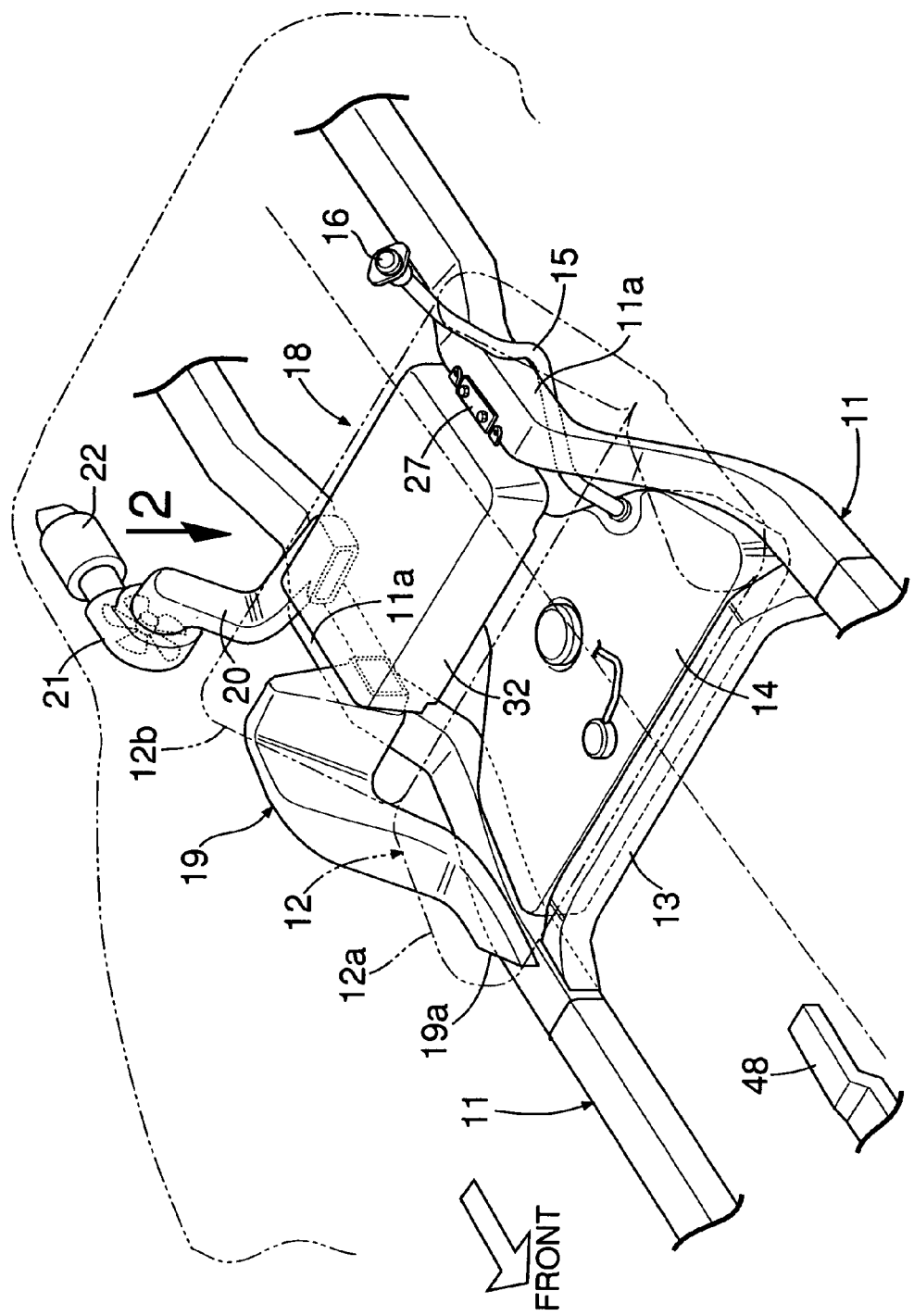
FIGS. 1 to 11 show a first embodiment of the present invention.

A first embodiment of the present invention will now be described with reference to FIGS. 1 to 11.

As shown in FIGS. 1 to 4, a hybrid automobile provided with an engine and a motor-generator as driving power sources includes a pair of side frames 11, 11 disposed in a longitudinal direction of a vehicle body on left and right sides of the vehicle body. The left and right side frames 11, 11 are connected to each other by a cross member 13 on a lower surface of a front portion of a seat cushion 12a of a rear seat 12. A fuel tank 14 is disposed in a space surrounded by the left and right side frames 11, 11, the cross member 13 and the lower surface of the seat cushion 12a. A fuel supply port 16 is provided at an upper end of a filler tube 15 extending rearwards and upwards from a left end of the fuel tank 14. The left and right side frames 11, 11 have upward curved portions 11a, 11a provided at locations corresponding to wheel housings 17, 17. A battery box 18 of a power source system for a power source of a motor-generator is connected at its left and right ends between apexes of the curved portions 11a, 11a. An intake duct 19 extends forwardly from a front portion of a right side of the battery box 18, and an exhaust duct 20 extends rearwardly from a rear portion of the right side of the battery box 18. A fan 21 and a silencer 22 are mounted at an intermediate portion of the exhaust duct 20.

As can be seen from FIGS. 5 to 9, thirty-six bar-shaped battery modules 23, which are comprised of a plurality of battery cells coupled in series and which are integrally bundled by a plurality of module holders 24, are clamped from above and below by a pair of lower battery support frames 25, 25 and a pair of upper battery support frames 26, 26. The pair of lower battery support frames 25, 25 curved downwards at their intermediate portions to support lower surfaces of the battery modules 23 are integrally coupled to each other at their opposite ends by fixing brackets 27, 27. The pair of upper battery support frames 26, 26 curved upwards to support upper surfaces of the battery modules 23 are fixed at their left and right ends to upper surfaces of the lower battery support frames 25, 25 by bolts 28.

The fixing brackets 27, 27 at the opposite ends of the lower battery support frames 25, 25 are coupled to upper surfaces of the curved portions 11a, 11a of the side frames 11, 11 by bolts 29. The curved portions 11a, 11a of the side frames 11, 11 are provided at locations corresponding to the wheel housings 17, 17 and hence, an upper end of a damper of a suspension system which is not shown is connected to the curved portions 11a, 11a, whereby a large load may be applied to the curved portions 11a, 11a. However, such portions can be reinforced without need for a special reinforcing member by connecting them to each other by the strong lower battery support frames 25, 25, thereby increasing the rigidity of the vehicle body. Thus, it is possible to accommodate an increase in weight due to the mounting of the battery box 18 without substantially changing the conventional vehicle body structure.

In addition, the battery box 18 having a larger weight is supported on the side frames 11, 11 and thus, the supporting thereof can be strengthened. Moreover, the bar-shaped battery modules 23 are disposed in a longitudinal direction of the vehicle body and are supported by the lower battery support frames 25, 25 and the upper battery support frames 26, 26 extending in a lateral direction of the vehicle body. Thus, the supporting of the bar-shaped battery modules 23 can be achieved easily and reliably.

The plurality of battery modules 23 bundled by the lower battery support frames 25, 25 and the upper battery support frames 26, 26 are covered with a lower battery cover 30 and an upper battery cover 31 each formed of an expandable synthetic resin, and further, their upper surfaces are covered with a battery case 32 made of a metal and having an opened lower surface. Left and right ends of the lower battery support frames 25, 25 are extended through the upper battery cover 31 to the outside. The lower battery cover 30 and the upper battery cover 31 each formed of the expandable synthetic resin and the battery modules 23 housed therein can be protected by covering the lower battery cover 30 and the upper battery cover 31 with the battery case 32 made of metal.

Figure 10:
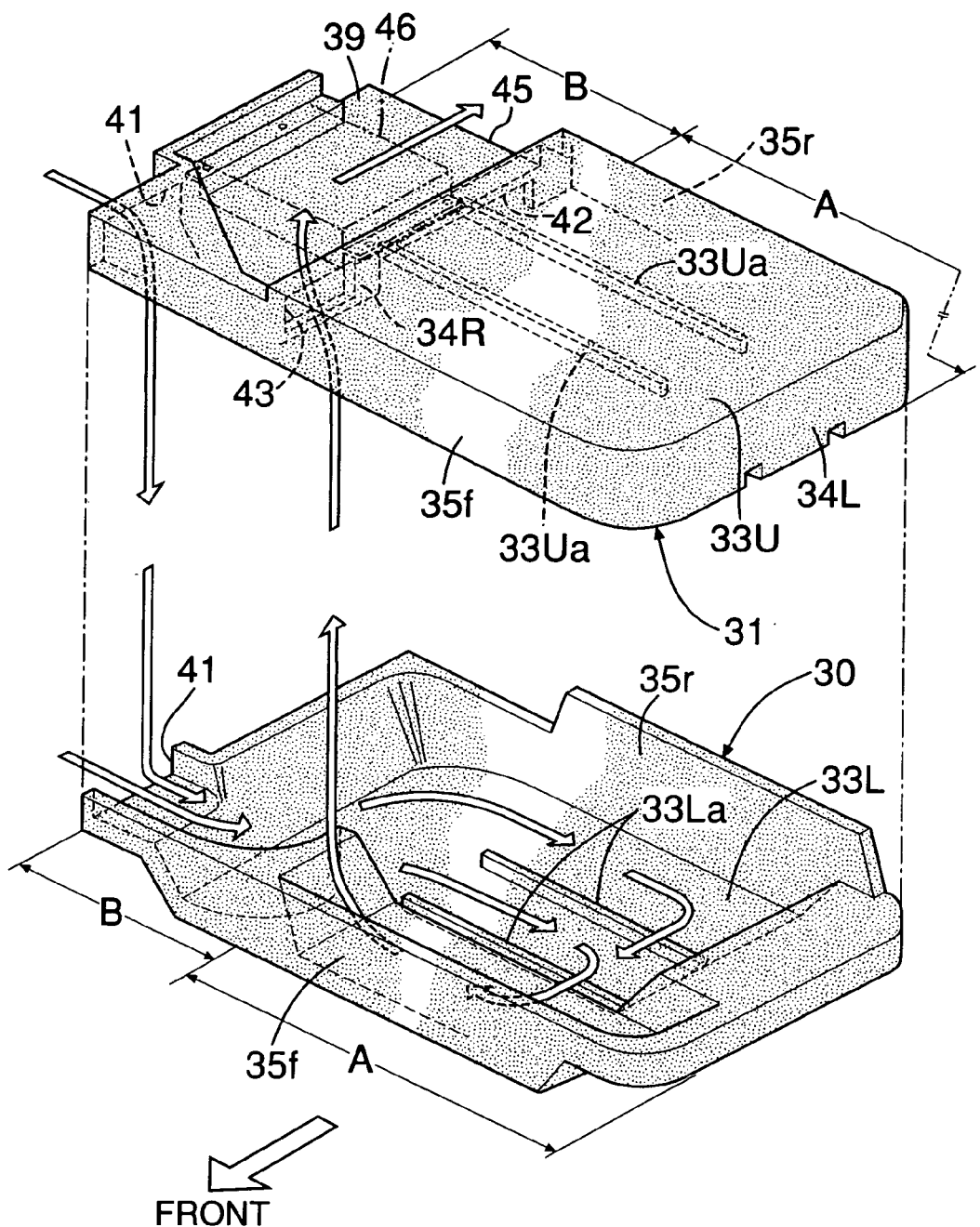
Figure 11:
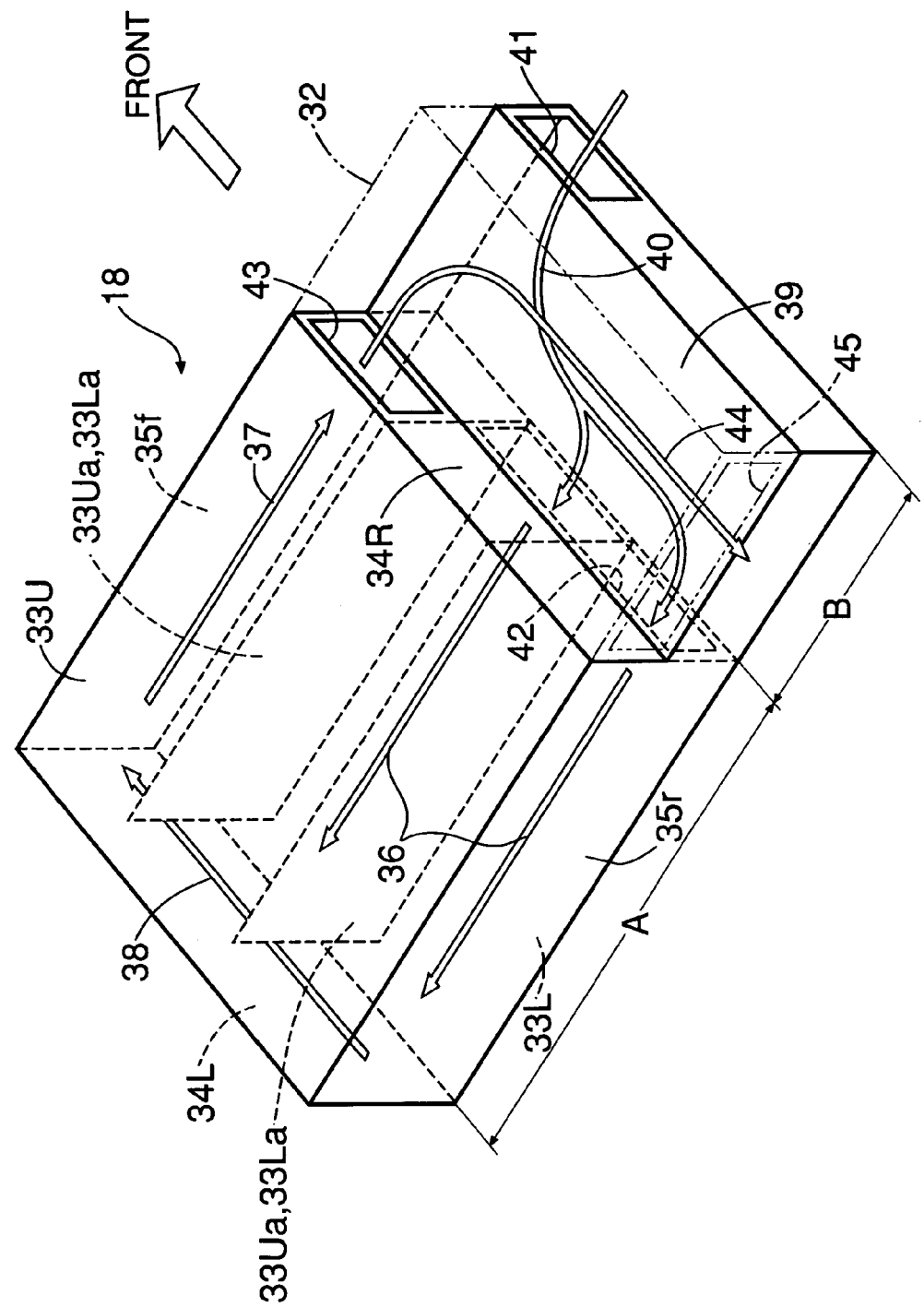

The structures of the lower battery cover 30 and the upper battery cover 31 will be described below with reference to FIGS. 10 and 11. FIG. 11 is a diagram corresponding to FIG. 10.

Each of the lower battery cover 30 and the upper battery cover 31 is comprised of a battery housing portion A located on a left side of the vehicle body, and a cooling air guiding portion B located on a right side of the vehicle body. The battery housing portion A is formed into a vertically flat rectangular parallelepiped shape including rectangular upper and lower walls 33U and 33L, a pair of longitudinally extending first sidewalls 34L and 34R, and a pair of laterally extending second sidewalls 35f and 35r.

In the battery housing portion A, two partition walls 33Ua, 33Ua formed laterally on a lower surface of the upper wall 33U and two partition walls 33La, 33La formed laterally on an upper surface of the lower wall 33L are in contact with the lower battery support frames 25, 25 and the upper battery support frames 26, 26. Two first cooling passages 36, 36 located on a rear side and a single second cooling passage 37 located on a front side are defined by the partition walls 33Ua, 33Ua; 33La, 33La. In addition, a longitudinally extending connecting passage 38 is formed along the first sidewall 34L on the left side. Left ends (terminal ends) of the first cooling passages 36, 36 communicate with a rear end (a starting end) of the connecting passage 38, and a front end (a terminal end) of the connecting passage 38 communicates with a left end (a starting end) of the second cooling passage 37, whereby the first cooling passages 36, 36, the connecting passage 38 and the second cooling passage 37 are disposed in a U-shape on the whole.

A partition wall 39 is horizontally formed on the cooling air guiding portion B of the upper battery cover 31 and connected to a right side of the first sidewall 34R on the right side, and a cooling air introducing passage 40 is formed between the partition wall 39 and the lower battery cover 30. A cooling air introducing port 41 is formed in a front portion of a right end of the lower battery cover 30 to lead to the cooling air introducing passage 40, and a first communication opening 42 is formed in a rear portion of the first sidewall 34R on the right side of the lower battery cover 30 to lead to the starting ends of the first cooling passages 36, 36. A second communication opening 43 is formed in a front portion of the right first sidewall 34R of the upper battery cover 31 to lead to the terminal end of the second cooling passage 37.

A cooling air discharging passage 44 is formed between the partition wall 39 of the upper battery cover 31 and the battery case 32, connected at its starting end to the second communication opening 43, and a cooling air discharging port 45 is formed at the terminal end of the cooling air discharging passage 44 by the partition wall 39 of the upper battery cover 31 and the battery case 32. A down converter 46 for lowering high pressures of the battery modules 23 is disposed on an upper surface of the partition wall 39 of the upper battery cover 32, so that the down converter 46 is located within the cooling air discharging passage 44.

The intake duct 19 connected to the cooling air introducing port 41 in the battery box 18 is disposed to extend along a right side of the seat cushion 12a and a right side of a seat back 12b of the rear seat 12. A suction port 19a opening into the right side of the seat cushion 12a to face rightwards and forwards is opposed to face a right rear door with a clearance. Therefore, it is possible to supply air conditioned to an appropriate temperature within a vehicle compartment to the battery box 18, particularly, in the summer season, while preventing the sitting property of the rear seat 12 from being hindered by the intake duct 19. Moreover, it is possible to ensure that the suction port 19a of the intake duct 19 is difficult to be seen in a state in which the right rear door is closed, leading to an enhancement in appearance. A sectional area of a path in the intake duct 19 is set at a value larger at any portion thereof than a sectional area of the suction port 19a. Thus, it is possible to suppress the flow resistance to cooling air flowing in the intake duct to the minimum (see FIG. 6).

A blow-out port 48 for blowing out heating air is provided in a floor at a location in front of the rear seat 12. The suction port 19a of the intake duct 19 is offset upwards and rightwards with respect to an extension line of the blow-out port 48 which opens to face rearwards, thereby preventing the high-temperature air blown out of the blow-out port 48 from being drawn directly into the intake duct 19. Thus, it is possible to prevent a reduction in cooling performance for the battery modules 23.

Figure 2:
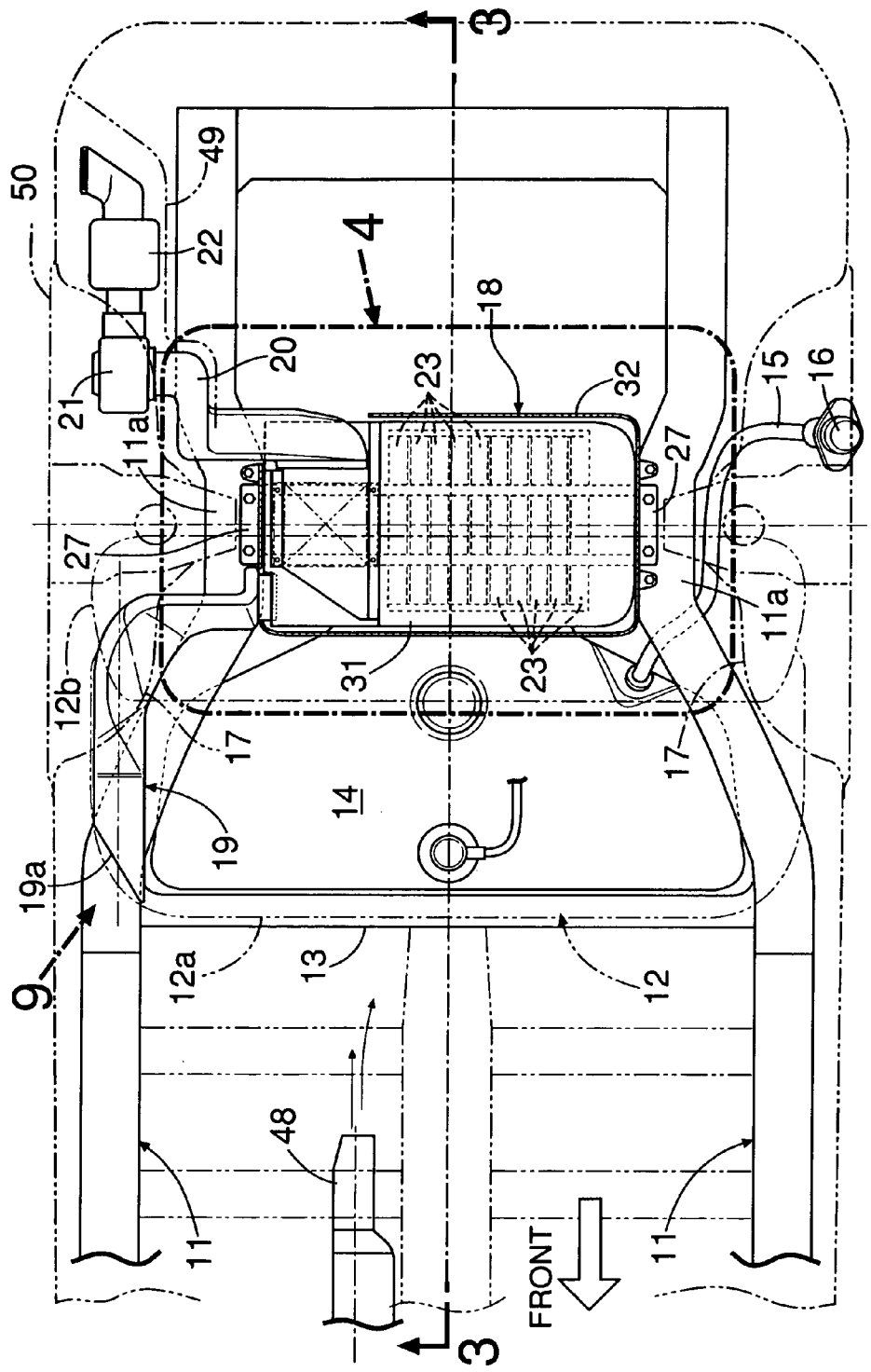
Figure 3:
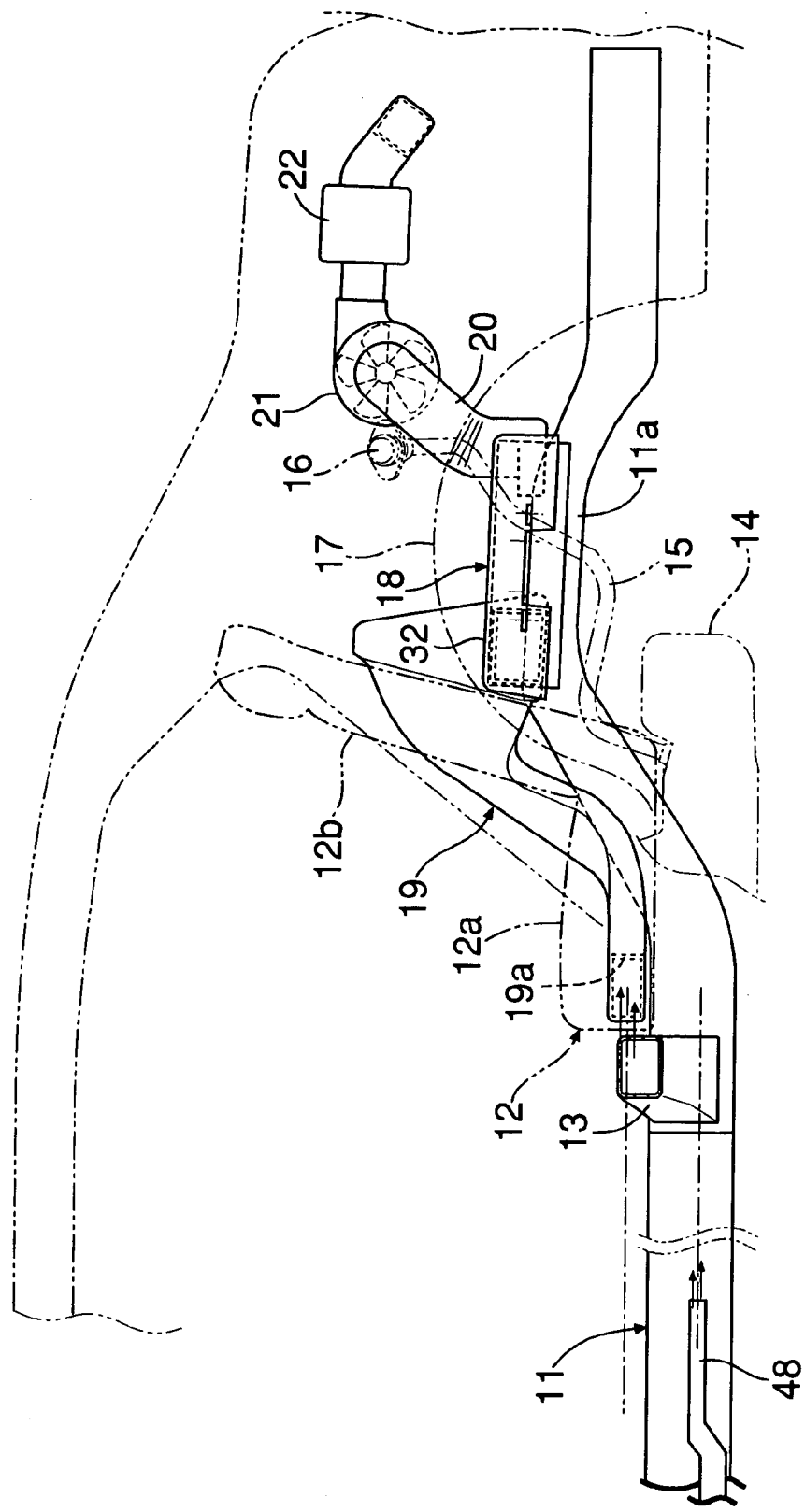
Figure 4:
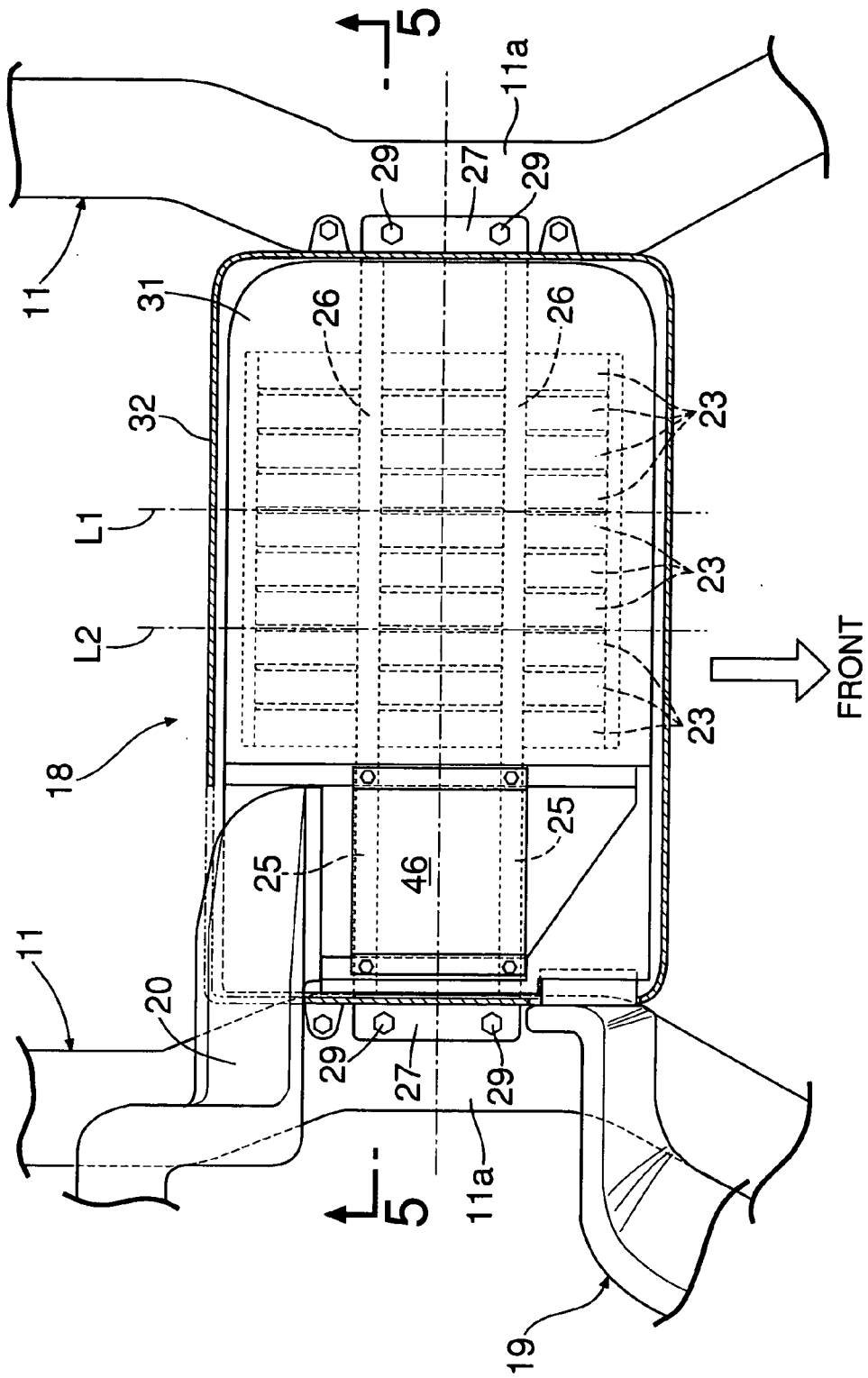
Figure 5:
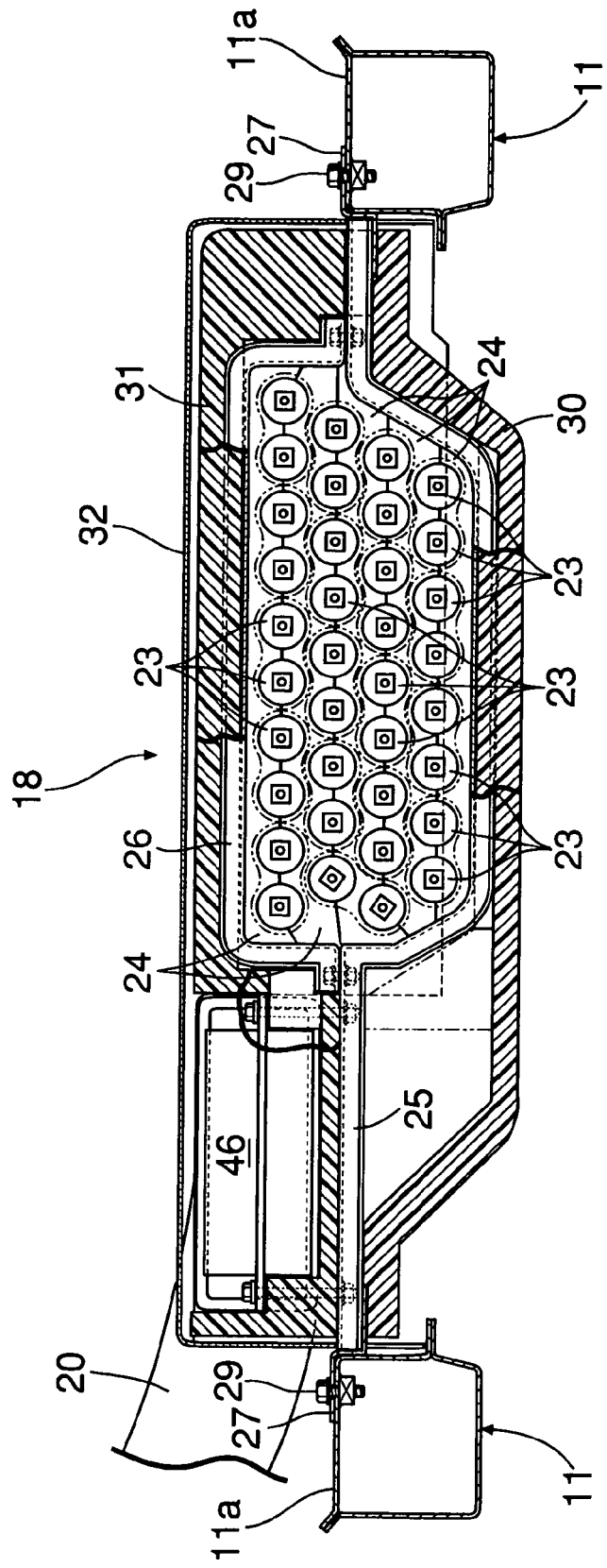
Figure 6:
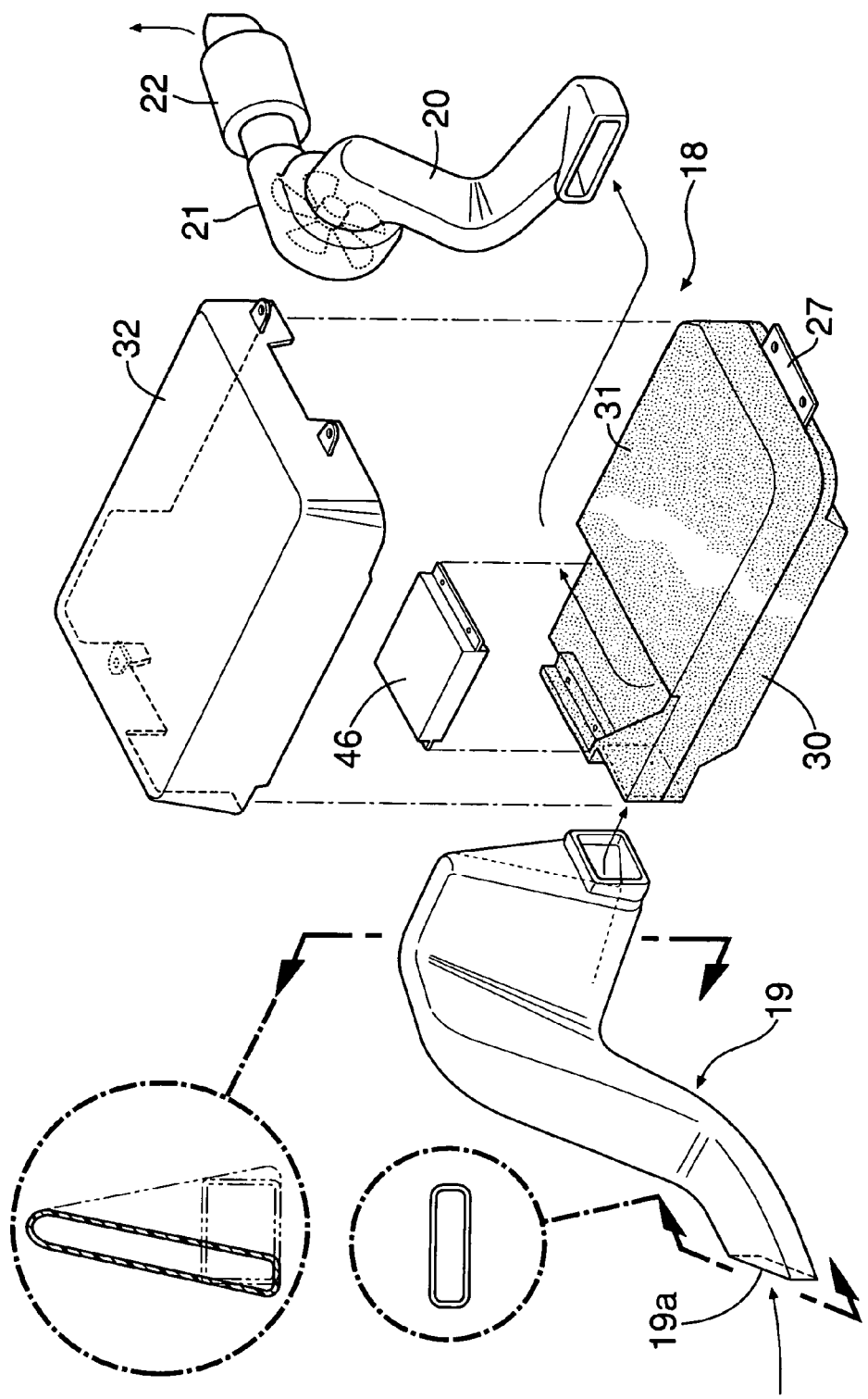
Figure 7:
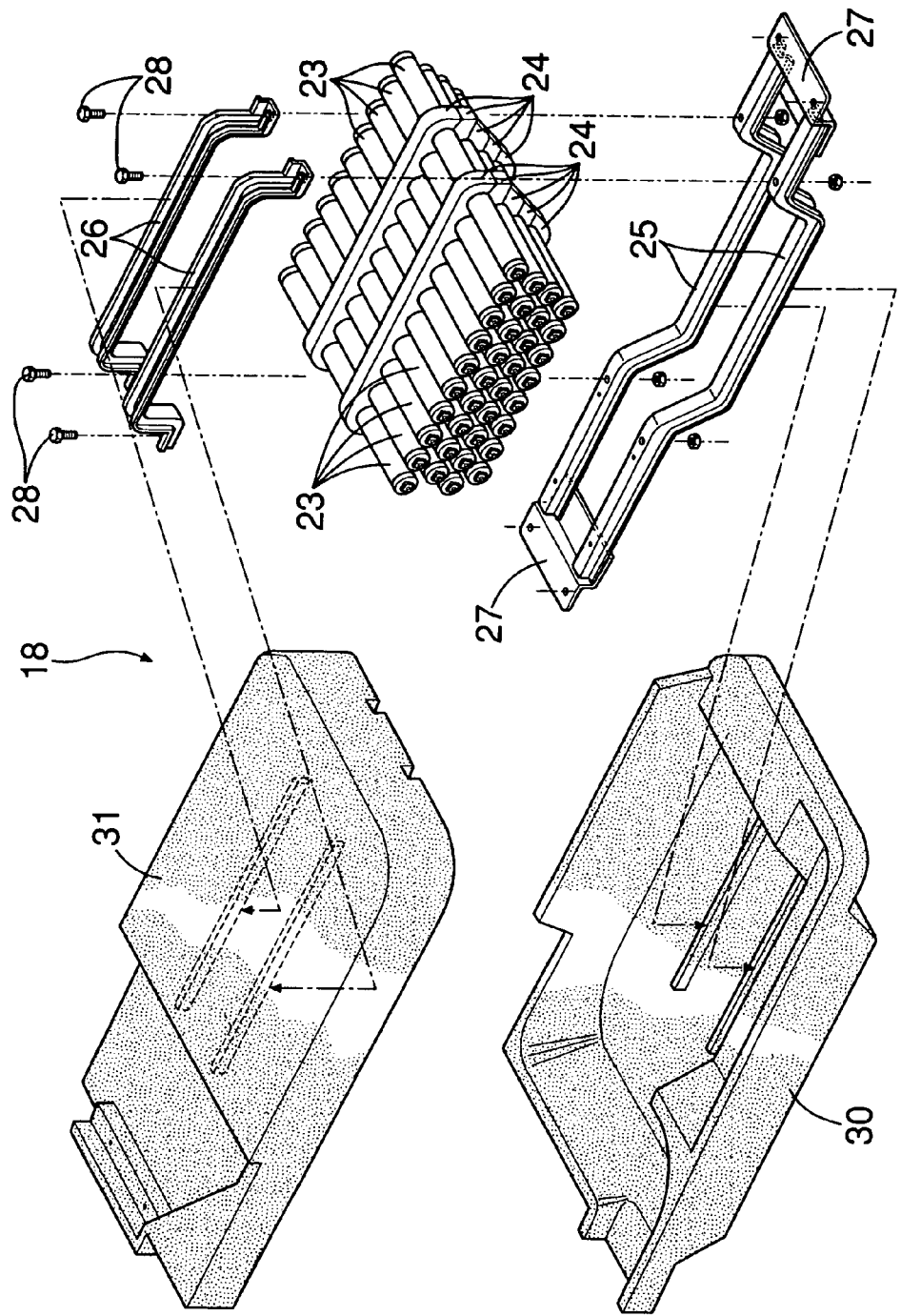
Figure 8:
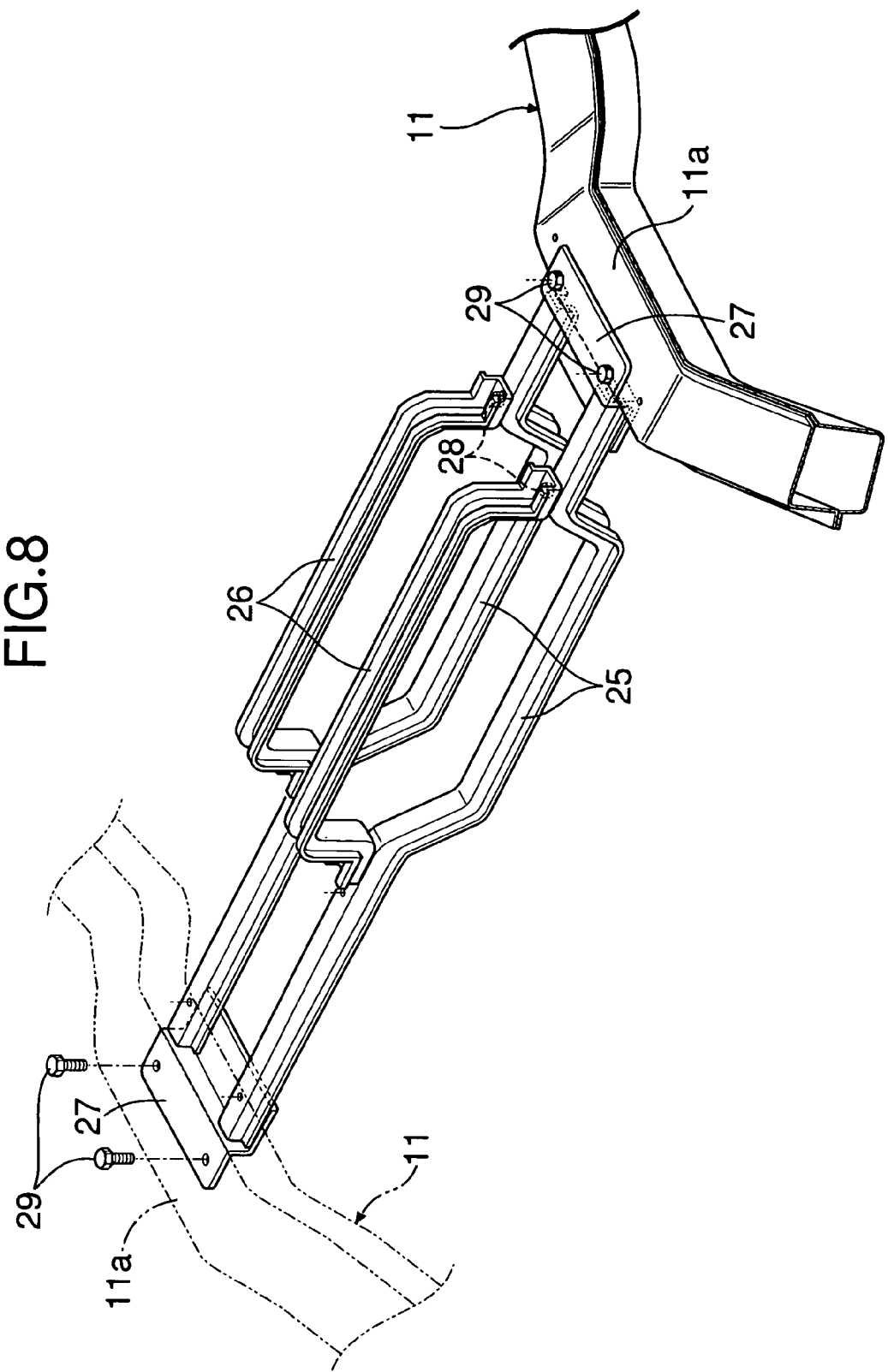
Figure 9:
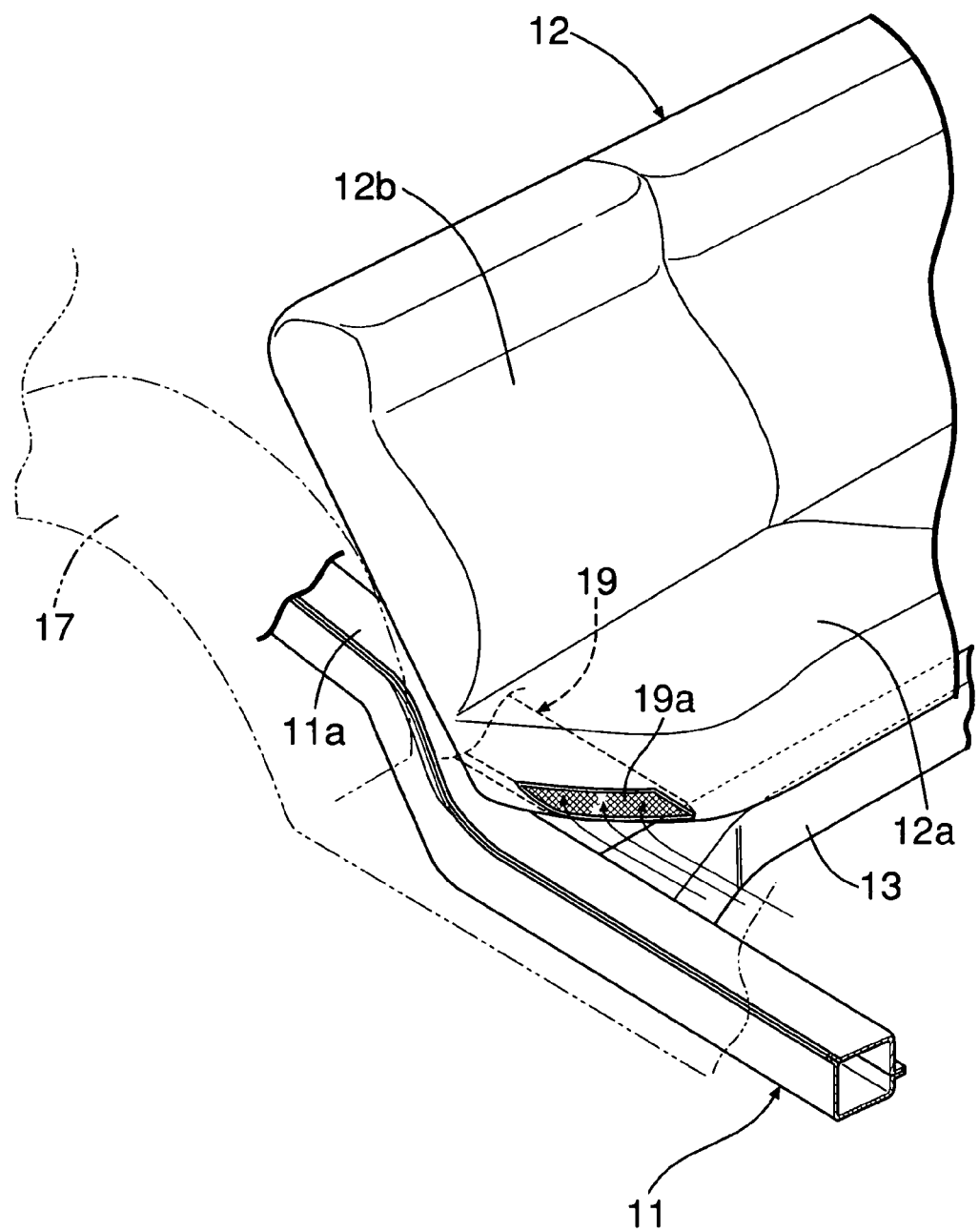

The exhaust duct 20 leading to the cooling air discharging port 45 in the battery box is disposed, along with the fan 21 and the silencer 22 mounted therein, in a space between an interior material 49 in a trunk room and an exterior plate 50 of the vehicle body (see FIG. 2). It is possible to reduce a noise leaked into the vehicle compartment by covering the fan 21 with the interior material 49, and it is also possible to reduce a noise caused by the flowing of the cooling air by the provision of the silencer 22.

The operation of the first embodiment of the present invention having the above-described arrangement will be described below.

When the fan 21 mounted in the exhaust duct 20 is driven to cool the battery modules 23 heated by the driving of the motor-generator, the air within the vehicle compartment is introduced through the suction port 19a of the intake duct 19 into the cooling air introducing port 41 in the battery box 18. The cooling air introduced into the cooling air introducing port 41 flows from the front to the rear in the cooling air introducing passage 40 provided below partition wall 39 of the cooling air guiding portion B of the battery box 18, and then flows into the two first cooling passages 36, 36 through the first communication opening 42 provided in the first sidewall 34R on the right side of the battery housing portion A of the battery box 18.

The cooling air flowing from the right to the left in the first cooling passages 36, 36 extending along the rear second sidewall 35r flows from the rear to the front in the connecting passage 38 extending along the first sidewall 34L on the left side, further flows from the left to the right in the second cooling passage 37 extending along the front second sidewall 35f, and is then discharged into the cooling air discharging passage 44 provided above the partition wall 39 through the second communication opening 43 provided in the first sidewall 34R on the right side.

While the cooling air is flowing through the first cooling passages 36, 36 and the second cooling passage 37, the battery modules 23 disposed therein are cooled by the cooling air. At this time, the cooling air flowing through the two upstream first cooling passages 36, 36 has a relatively low temperature, but its flow speed is decreased due to a larger sectional area of flow paths thereof. On the other hand, the cooling air flowing in the single second cooling passage 37 has a relatively high temperature, but its flow speed is increased due to a smaller sectional area of a flow path thereof, so that all the battery modules 23 can be cooled uniformly.

In addition, because the down converter 46 is disposed in the cooling air discharging passage 44 through which the cooling air is passed after cooling the battery modules 23, the down converter 46 can be cooled utilizing the cooling air which has cooled the battery modules 23. Then, the cooling air discharged from the cooling air discharging port 45 into the exhaust duct 20 is passed through the fan 21 and silenced by the silencer 22, and thereafter, the cooling air is discharged into the space between the interior material 49 in the trunk room and the exterior plate 50 of the vehicle body.

A centerline L1 of the battery housing portion A of the battery box 18 is offset leftwards of the vehicle body with respect to a centerline L2 of the vehicle body, and the cooling air guiding portion B, the intake duct 19 and the exhaust duct 20 are disposed in a space consequently formed on a right side of the vehicle body. Therefore, the battery box 19 can be disposed compactly in a limited space between the rear seat 12 and the trunk room. Moreover, the filler tube 15 of the fuel tank 14 is disposed on the left side of the vehicle body opposite from the intake duct 19 and the exhaust duct 20 and hence, the filler tube 15 can be prevented from interfering with the intake duct 19 and the exhaust duct 20, leading to an increase in degree of freedom for the layout.

Additionally, the cooling air guiding portion B is integrally provided adjacent to the battery housing portion A of the battery box 18, and the cooling air introducing passage 40 and the cooling air discharging passage 44 cross each other within the cooling air guiding portion B. Therefore, it is possible to provide the cooling air introducing port 41 and the cooling air discharging port 45 in the right side and the rear surface of the cooling air guiding portion B, respectively, leading to an increase in degree of freedom for the layout of the intake duct 19 and the exhaust duct 20. In addition, the cooling air introducing passage 40 and the cooling air discharging passage 44 are separated vertically from each other with the partition wall 39 interposed therebetween and hence, the cooling air introducing passage 40 and the cooling air discharging passage 44 can be easily crossed to each other, thereby suppressing an increase in flow resistance to the cooling air to the minimum.

Although the cooling air introducing port 41 and the cooling air discharging port 45 are provided in the right side and the rear surface of the cooling air guiding portion B, respectively, in the embodiment, they can be provided at any locations in the cooling air guiding portion B, depending on the demand for the layout of the intake duct 19 and the exhaust duct 20, whereby the interference of the intake duct 19 and the exhaust duct 20 with each other can be avoided, leading to an increase in degree of freedom for the layout.

A second embodiment of the present invention will now be described with reference to FIGS. 12 to 15B.

Figure 12:
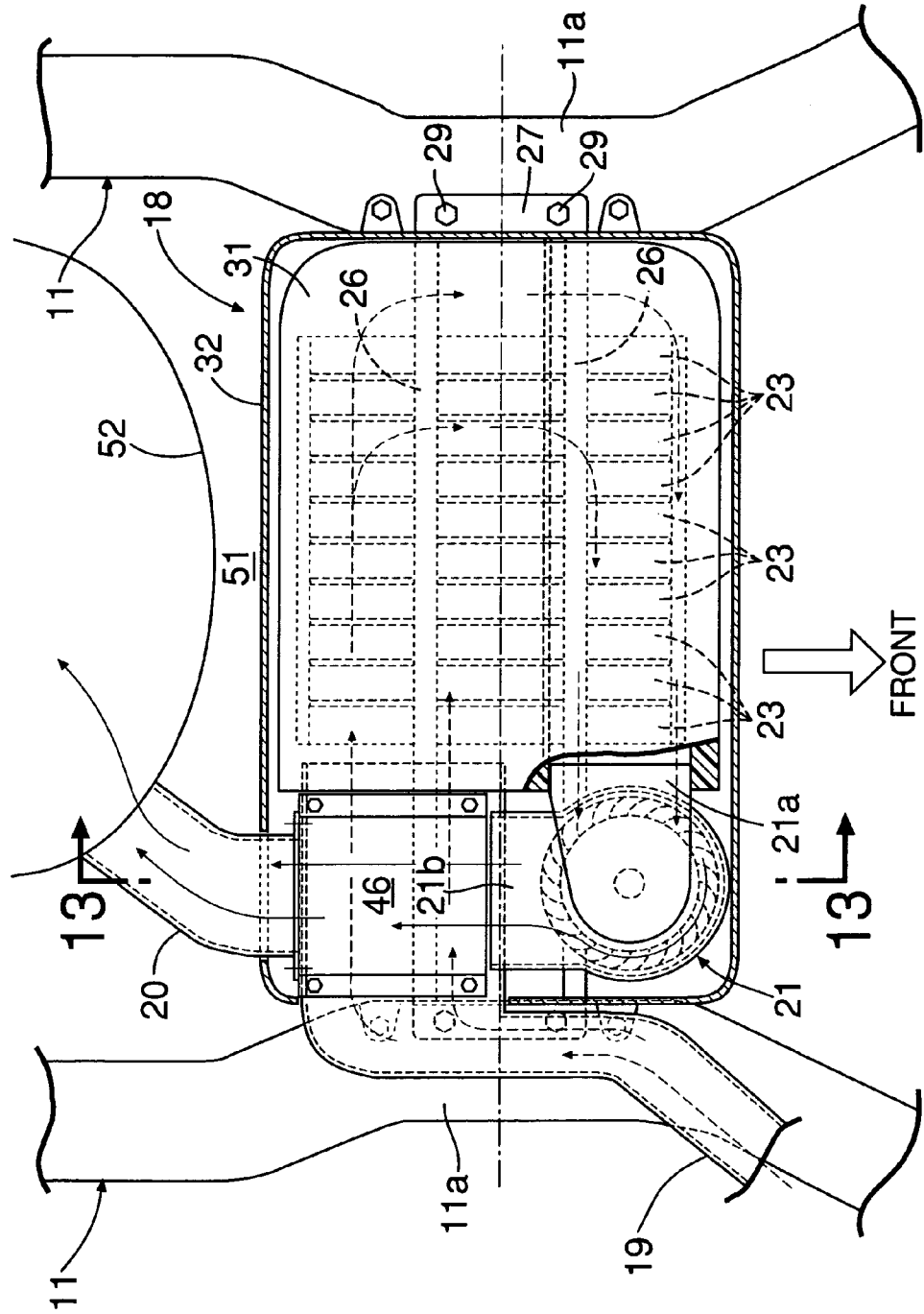
Figure 13:
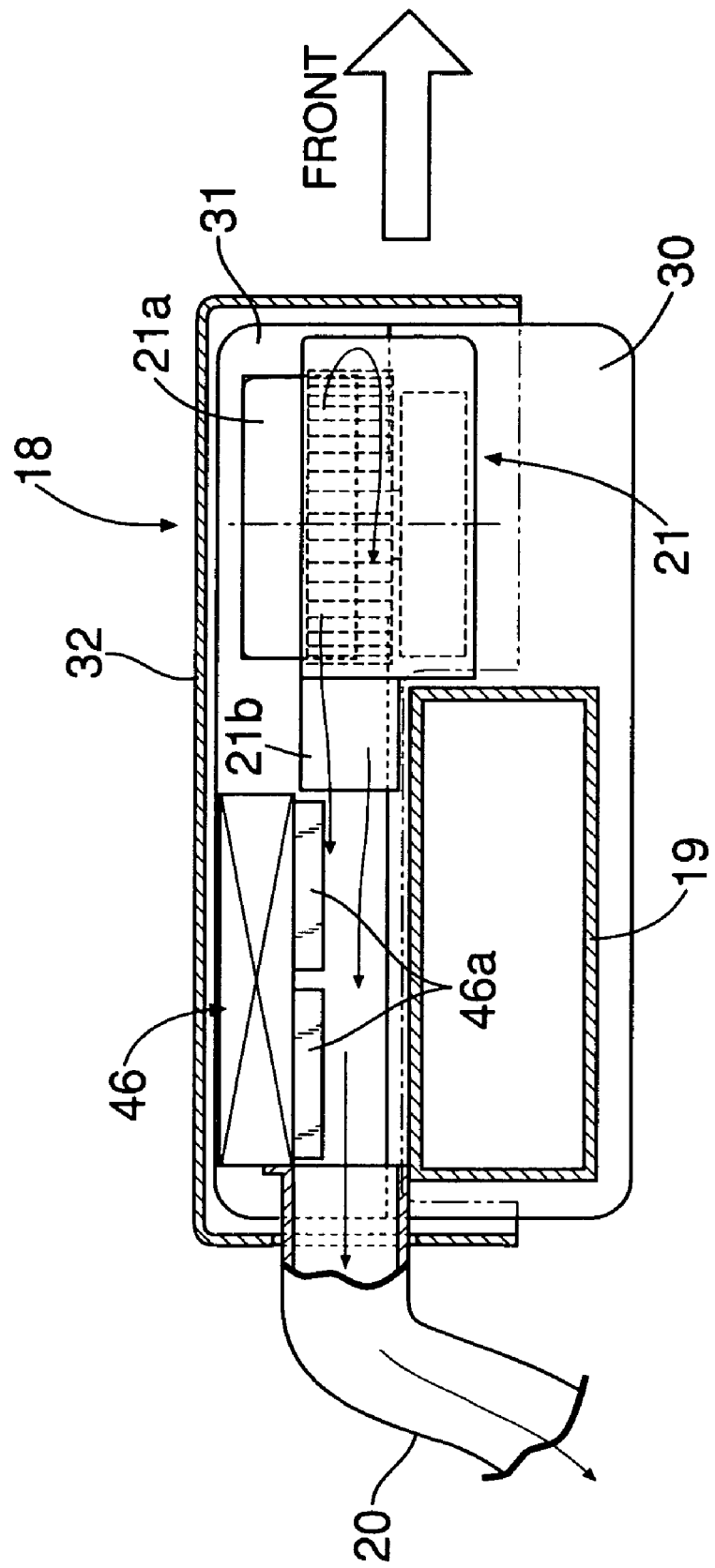
Figure 14:
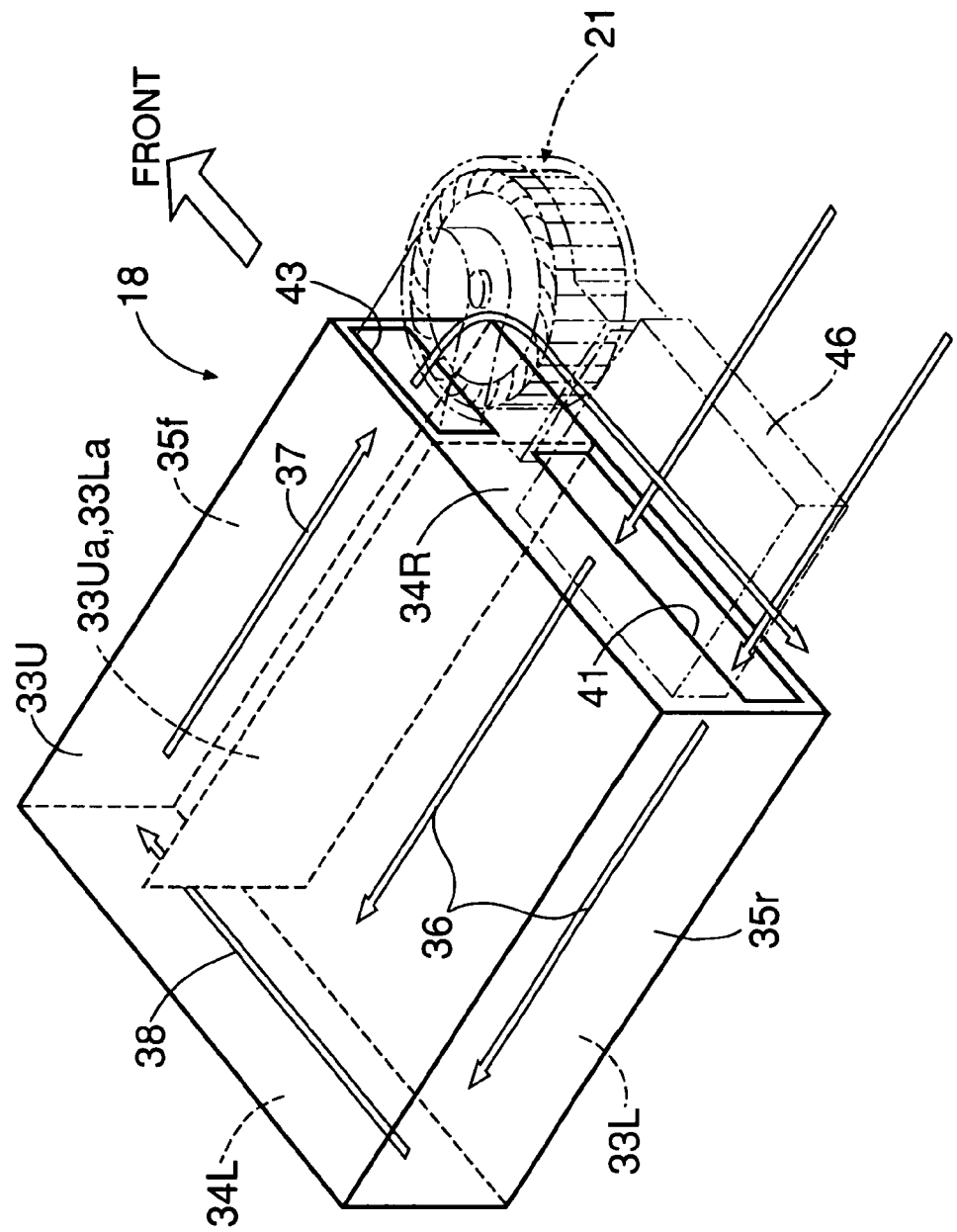

In the above-described first embodiment, the fan 21 is mounted at the downstream end of the exhaust duct 20, but in the second embodiment, a fan 21 is mounted between lower and upper battery covers 30 and 31 of a battery box 18 and a down converter 46 at an upstream end of an exhaust duct 21, as shown in FIGS. 12 to 14.

The structure of the battery box 18 is simpler than that in the first embodiment; a cooling air introducing port 41 and a communication opening 43 are formed in right end faces of the lower and upper battery covers 30 and 31 of the battery box 18, and a single partition wall 33Ua, 33La is formed within the lower and upper battery covers 30 and 31. An intake duct 19 is connected at its downstream end to the cooling air introducing port 41; an intake passage 21a of the fan 21 such as a sirocco fan is connected to the communication opening 43; and the down converter 46 is disposed to face an exhaust passage 21b of the fan 21. The lower and upper battery covers 30 and 31, the fan 21 and the down converter 46 are covered from above with a battery case 32, and the exhaust duct 20 is connected at its upstream end to a rear surface of a right end of the battery case 32. The exhaust duct 20 communicates at its downstream end with a front end of a tire pan 52 provided on a floor surface of a trunk room 51.

Therefore, when the fan 21 is operated, cooling air within a vehicle compartment is introduced through the intake duct 19 into a cooling air introducing port 41 in the lower and upper battery cover 30 and 31; flows from the right to the left within the rear first cooling passages 36, 36; then flows from the rear to the front within the left connecting passage 38; further flows from the left to the right within the front second cooling passage 37 to cool the battery modules 23; and is then drawn into the fan 21 through the communication opening 43 and the intake passage 21a. The cooling air exiting the exhaust passage 21b of the fan 21 is brought into contact with cooling fins 46a projecting downwardly on a lower surface of the down converter 46 to cool the down converter 46; is then supplied into the tire pan 52 through the exhaust duct 20; and a portion of the cooling air is returned from the tire pan 52 into the vehicle compartment, while the remaining portion is discharged to the outside of the vehicle.

Thus, also with the second embodiment, it is possible to achieve the same functional effect as that of the first embodiment, and further it is additionally possible to achieve the following functional effects.

If the fan 21 is mounted at the downstream end of the exhaust duct 20 as in the first embodiment, the pressure of the cooling air flowing through the path from the intake duct 19 on the upstream side via the battery box 18, the down converter 46 and the exhaust duct 20 to the fan 21 is decreased linearly from atmospheric pressure, as shown in FIG. 15A. Therefore, the absolute value of a negative pressure in the region of the exhaust duct 20 is increased, thereby making the sealing difficult.

On the other hand, in the second embodiment, the fan 21 is mounted upstream of the down converter 46 and the exhaust duct 20 and hence, the pressure in the path from the intake duct 19 on the upstream side via the battery box 18 to the fan 21 is decreased linearly from atmospheric pressure; increased discontinuously to a level higher than atmospheric pressure in the fan 21; and then decreased down to atmospheric pressure after flowing through the down converter 46 and the exhaust duct 20, as shown in FIG. 15B. Therefore, the absolute values of a negative pressure and a positive pressure on upstream and downstream sides of the fan 21 are decreased, thereby facilitating the sealing the flow path for the cooling air.

Also, in the first embodiment, there is a problem that the exhaust duct 20 decreases the volume of the trunk room, because the exhaust duct 20 is connected to the space between the interior material 49 of the trunk room and the exterior plate 50 of the vehicle body. In the second embodiment, however, the length of the exhaust duct 20 can be reduced to the minimum to increase the volume of the trunk room 51, because the exhaust duct 20 is connected to the front end of the tire pan 52 formed on the floor surface of the trunk room 51.

Although the embodiments of the present invention have been described above, the present invention is not limited to the above-described embodiments, and various modifications in design may be made without departing from the subject matter of the invention defined in the claims.

For example, the power source system for the hybrid automobile has been described in each of the embodiments, but the present invention is also applicable to a power source system for an electric automobile.

In addition, the intake duct 19 and the exhaust duct 20 are mounted on the right side of the battery box 18 in each of the embodiments, but may be mounted on the left side.

Further, the electrical equipment of the present invention is not limited to the down converter 46 in each of the embodiments.

We claim:

1. A power source device for a vehicle having left and right side frames extending longitudinally with respect thereto, said power source device, comprising:
a battery box, housing one or more battery modules, and being mounted on a vehicle body, said one or more battery modules supplying electric power to a motor for driving the vehicle, wherein the battery box is mounted between the left and right side frames such that said one or more battery modules are offset altogether to one of a left and right side of the vehicle, with respect to a center line thereof, such that a majority of said battery or battery modules are located on said left or right side of the vehicle with respect to the center line;
an intake duct connected to the battery box at an other of the left and right sides of the vehicle, for supplying cooling air to said one or more battery modules; and
an exhaust duct connected to the battery box at said other of the left and right sides of the vehicle, for exhausting cooling air from said one or more battery modules.

2. A power source device for a vehicle according to claim 1, wherein the battery box is connected at each end thereof to respective left and right side frames.

3. A power source device for a vehicle according to claim 1, wherein a fan is mounted on the exhaust duct and disposed in a space between an exterior plate of the vehicle body and an interior material.

4. A power source device for a vehicle according to claim 3, wherein a silencer is mounted on the exhaust duct at a location downstream from the fan.

5. A power source device for a vehicle according to any of claims 1 to 4, wherein a filler tube for a fuel tank is mounted on a side of the vehicle opposite from the intake duct and the exhaust duct.

6. A power source device for a vehicle according to claim 1 or 2, wherein an electrical equipment is disposed between a fan connected to a cooling air outlet in the battery box and a cooling air inlet of the exhaust duct to cool the electrical equipment.

7. A power source device for a vehicle according to claim 6, wherein the exhaust duct is connected to a tire pan formed on a floor surface of a trunk room.

8. A power source device for a vehicle having left and right side frames extending longitudinally with respect thereto, said power source device comprising:
a battery box including a battery cover and a plurality of battery modules housed inside the battery cover, the battery modules supplying electric power to a motor for driving the vehicle,
wherein the battery box further includes battery support frames supporting the battery modules and passing through an opening in the battery cover in a lateral direction of a vehicle body, the battery support frames being connected at their left and right ends to the left and right side frames.

9. A power source device for a vehicle according to claim 8, wherein the battery support frames are connected at their left and right ends to the left and right side frames at a location corresponding to a wheel housing.

10. A power source device for a vehicle according to claim 8, wherein the battery modules comprise a plurality of elongated battery cells connected in series, and being disposed longitudinally of the vehicle body.

11. A power source device for a vehicle according to any of claims 8 to 10, wherein the battery cover is covered with a battery case made of a metal.

12. A power source device for a vehicle, comprising:
- a battery box housing a battery and disposed in the rear of a seat on which an occupant sits, and substantially between rear wheels of the vehicle, the battery supplying electric power to a motor for driving the vehicle; and
- an intake duct for supplying air from a vehicle passenger compartment into the battery box to cool the battery, wherein the intake duct is disposed in a space between the seat and a side portion of a vehicle body, and a suction port of the intake duct opens below a sitting surface of the seat in the vehicle passenger compartment and into a space between a side face of a seat cushion and an inner face of a door.

13. A power source device for a vehicle according to claim 12, wherein an air-conditioning blow-out port opens in front of and below the seat to face rearwards, and the suction port is offset upwards with respect to the blow-out port.

14. A power source device for a vehicle according to either one of claims 12 and 13, wherein the intake duct has a sectional area of a flow path set at a value larger than an area of the suction port.

* * * * *